United States Patent
Vaiano et al.

(10) Patent No.: US 6,811,036 B1
(45) Date of Patent: Nov. 2, 2004

(54) DRINKING STRAW WITH INTEGRAL FILTRATION SYSTEM

(76) Inventors: Vincent Vaiano, 113-01 Liberty Ave., Richmond Hill, NY (US) 11419; Alfonso Vaiano, 113-01 Liberty Ave., Richmond Hill, NY (US) 11419

(*) Notice: Subject to any disclaimer, the term of this patent is extended or adjusted under 35 U.S.C. 154(b) by 0 days.

(21) Appl. No.: 10/277,120

(22) Filed: Oct. 21, 2002

(51) Int. Cl.[7] .............................................. B10D 35/02
(52) U.S. Cl. ................. 210/459; 210/489; 210/497.01; 210/502.1; 210/508; 239/33
(58) Field of Search ..................... 210/459, 488–492, 210/497.01, 502.1, 503, 505, 508, 455, 266, 282, 287; 239/33

(56) References Cited

U.S. PATENT DOCUMENTS

| | | | | |
|---|---|---|---|---|
| 1,000,332 A | * | 8/1911 | Dyer ........................... | 210/251 |
| 1,333,011 A | * | 3/1920 | Crady ......................... | 210/251 |
| 2,781,312 A | * | 2/1957 | Klumb et al. ................. | 210/94 |
| 3,389,803 A | * | 6/1968 | Barley ........................ | 210/266 |
| 4,298,475 A | * | 11/1981 | Gartner ...................... | 210/266 |
| 4,995,976 A | * | 2/1991 | Vermes et al. ............... | 210/266 |
| 5,045,195 A | * | 9/1991 | Spangrud et al. ........... | 210/266 |
| 5,156,335 A | * | 10/1992 | Smith et al. .................. | 239/33 |
| 5,273,649 A | * | 12/1993 | Magnusson et al. ........ | 210/232 |
| 5,518,613 A | * | 5/1996 | Koczur et al. .............. | 210/266 |
| 5,545,315 A | * | 8/1996 | Lonneman ................... | 210/120 |
| 6,475,386 B1 | * | 11/2002 | Carr et al. ................... | 210/266 |
| 6,485,644 B2 | * | 11/2002 | Bowler ........................ | 210/282 |
| 6,602,406 B1 | * | 8/2003 | Nohren et al. .............. | 210/136 |
| 2002/0088745 A1 | * | 7/2002 | Barlow ........................ | 210/266 |

OTHER PUBLICATIONS

Hawley's Condensed Chemical Dictionary (Lewis, Richard J. Sr., 13th edition, pp. 209–210.*

* cited by examiner

*Primary Examiner*—Terry K. Cecil
(74) *Attorney, Agent, or Firm*—Michael I. Kroll (57) ABSTRACT

The invention discloses a drinking straw with an integral filtration system including a plurality of filter types to extract or neutralize toxins such as heavy metals, chemicals, microbiological biological cysts and other such impurities and contaminants from a beverage as it is being consumed.

2 Claims, 8 Drawing Sheets

DRINKING STRAW WITH INTEGRAL FILTRATION SYSTEM

BACKGROUND OF THE INVENTION

1. Field of the Invention

The present invention relates generally to water filtration and, more specifically, to a drinking straw with an integral filtration system including a plurality of filter types to extract or neutralize toxins such as heavy metals, chemicals, microbiological cysts and other such impurities and contaminants from a fluid as it is being consumed.

2. Description of Art

Numerous vehicle-drinking fluid purification devices are known in the art. While these devices may be suitable for the particular purpose to which they address, they would not be as suitable for the purposes of the present described.

SUMMARY OF THE PRESENT INVENTION

A primary object of the present invention is to provide a drinking straw having a fluid filtration system integral with the straw wherein any fluid drawn therethrough by a user must pass through said filtration system to remove any undesirable contaminants or pathogens that might present a health hazard to the user prior to introduction into the users body.

Another object of the present invention is to provide a drinking straw having an integral filtration system comprising a plurality of filter elements each designed to remove specific contaminants.

Still another object of the present invention is to provide a drinking straw having an integral filtration system that allows the user to purify a beverage by simply drinking the fluid through the straw of the present invention.

Yet another object of the present invention is to provide a drinking straw having an integral filtration system including a charcoal filter, a wool filter and a bacterial filter in series.

Another object of the present invention is to provide a drinking straw having an integral filtration system that allows the user to purify beverages inconspicuously without bringing it to the attention of others.

One other object of the present invention is to provide a drinking straw having an integral filtration system that is compact enough to be carried in a users pocket.

Another object of the present invention is to provide a drinking straw having an integral filtration system that is simple and easy to use.

Yet another object of the present invention is to provide a drinking straw having an integral filtration system that is inexpensive to manufacture to and operate.

Additional objects of the present invention will appear as the description proceeds.

The present invention overcomes the shortcomings of the prior art by providing a drinking straw with an integral filter system to remove a wide range of pathogens that may compromise the health of the user if taken internally with the user only needing to drink the fluid through the straw to perform the purification process. The present invention may be used easily and inconspicuously in public.

The foregoing and other objects and advantages will appear from the description to follow. In the description reference is made to the accompanying drawing, a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the figures illustrate the purification system of the present invention. With regard to the reference numerals used, the following numbering is used throughout the various drawing figures.

10 purification system of the present invention
12 tubular housing
14 interior conduit
16 first end of 12
18 second end of 12
20 fluid
22 charcoal filter element
24 wool fiber element
26 bacterial filter element
28 chart of charcoal filtering
30 chart of wool filtering
32 chart of biological filtering
34 chart of system filtering
36 unfiltered beverage chamber
38 filtered beverage chamber

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Figure 1:
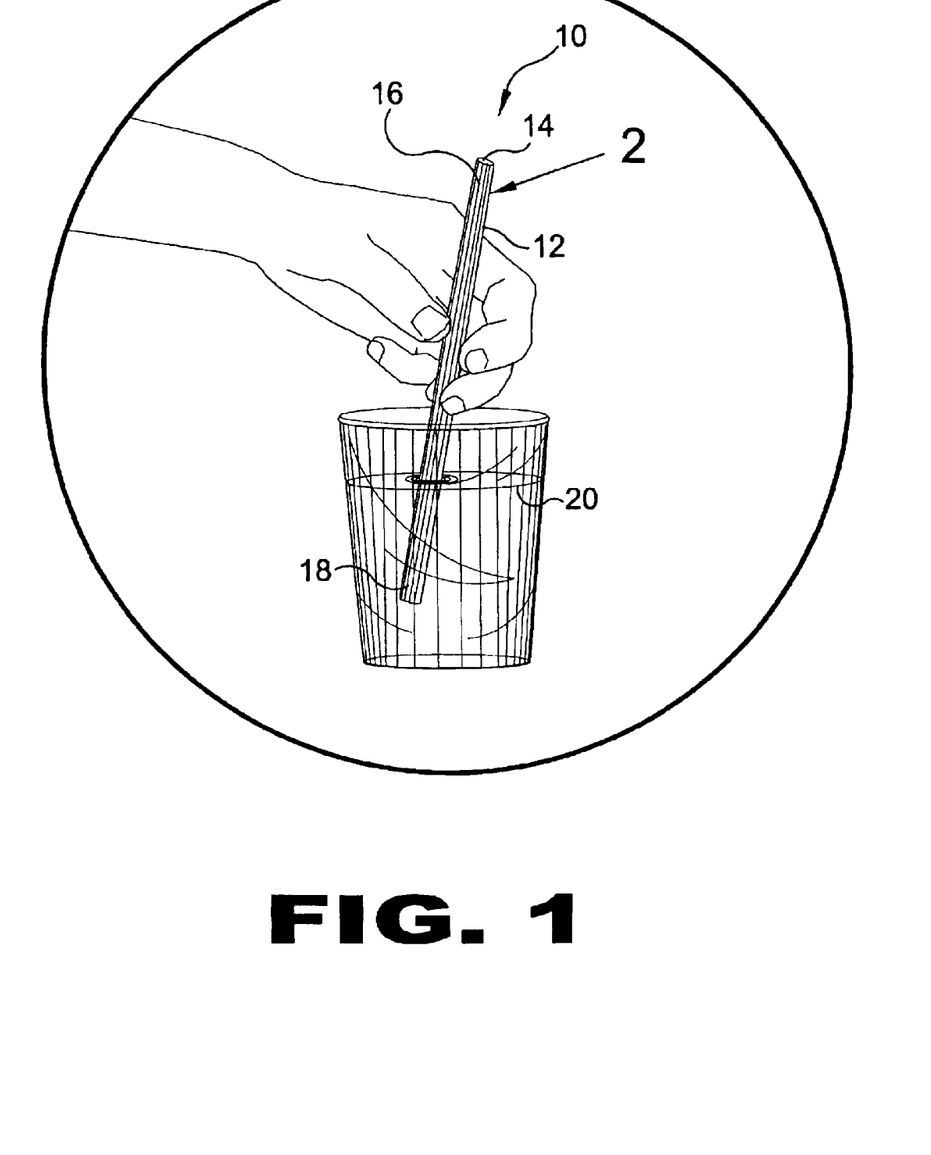
FIG. 1 is an illustrative view of the present invention in use.

Referring to FIG. 1, shown is the present invention in use. The purification system 10 of the present invention comprises a tubular member 12 having a throughbore 14 with said tubular member 12 having a first end 16 and second end 18. The first end 16 is inserted into the mouth while the second distal end 18 is inserted into a beverage 20 to be consumed. The tubular member 12 contains at least one filtering element, not shown, that is used to remove impurities from the beverage. The straw can be used anywhere suspicion of unfiltered drinking water exists, such as a park water fountain, restaurants, vacation trips or general travel.

Figure 2:
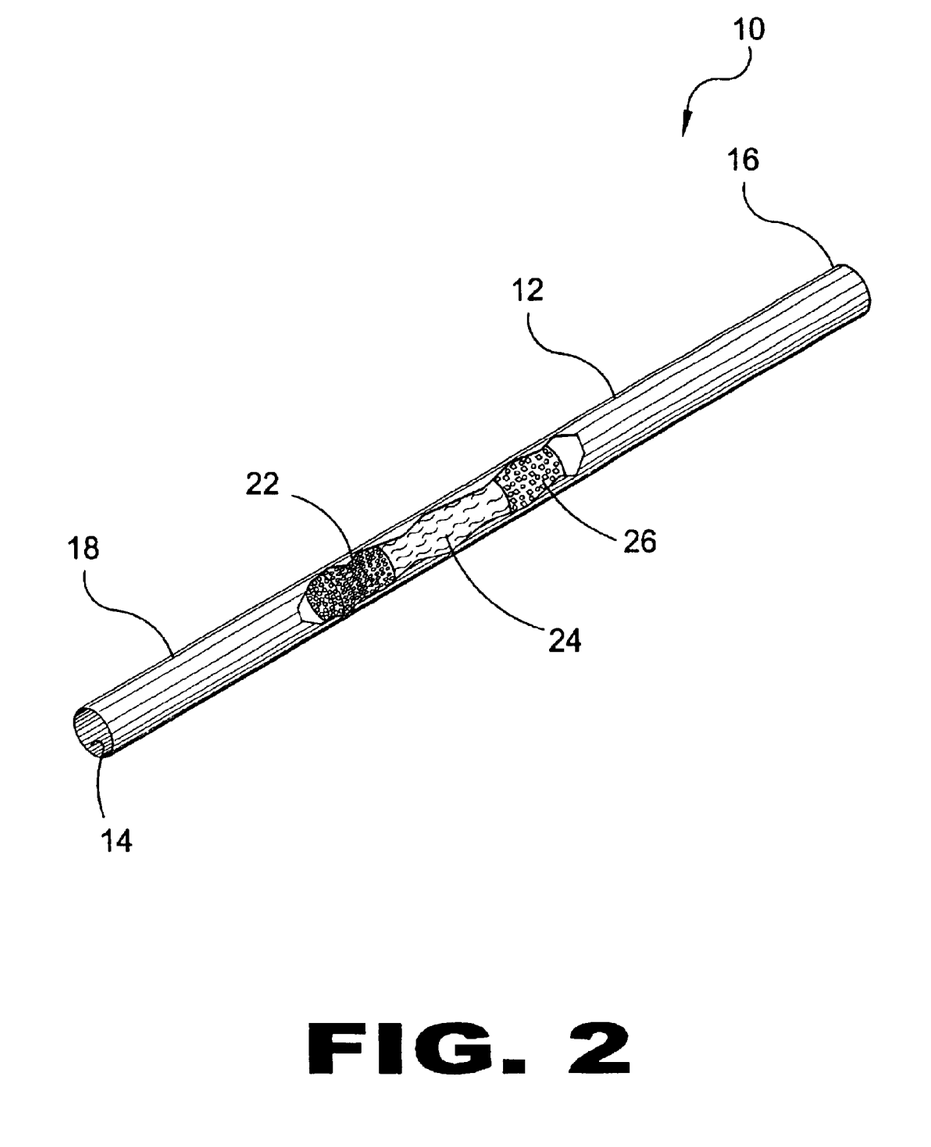
FIG. 2 is a perspective view of the present invention.

Referring to FIG. 2, shown is a section view of the purification system 10, of the present invention. The tubular member 12 having a throughbore 14 with said tubular member 12 having a first end 16 and second end 18. The first end 16 is inserted into the mouth while the second distal end 18 is inserted into a beverage to be consumed. The tubular member 12 contains in the preferred embodiment a granulated carbon filter element 22, fibrous filter element 24 and biological filter element 26 that are used in combination to remove impurities from a predetermined beverage.

Figure 3:
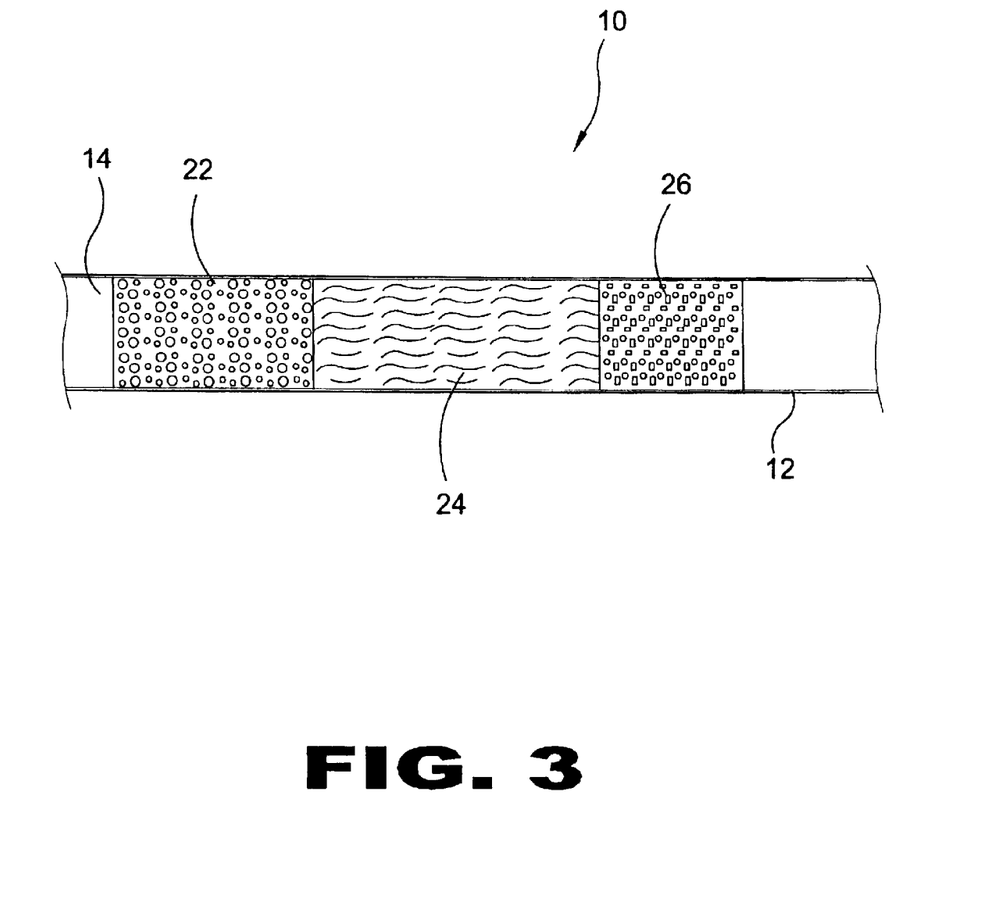
FIG. 3 is a sectional view of the present invention.

Referring to FIG. 3, shown is the filtering elements of the purification system 10 of the present invention. The tubular member 12 has a throughbore 14 wherein is fixedly positioned a plurality of filtering elements. One is a charcoal filtering element 22, fibrous filtering element, in the preferred embodiment wool 24 and a biological filtering element 26. Each of the filtering elements performs a function that will result in the removal from a predetermined beverage certain impurities that can be harmful to human life.

Figure 4:
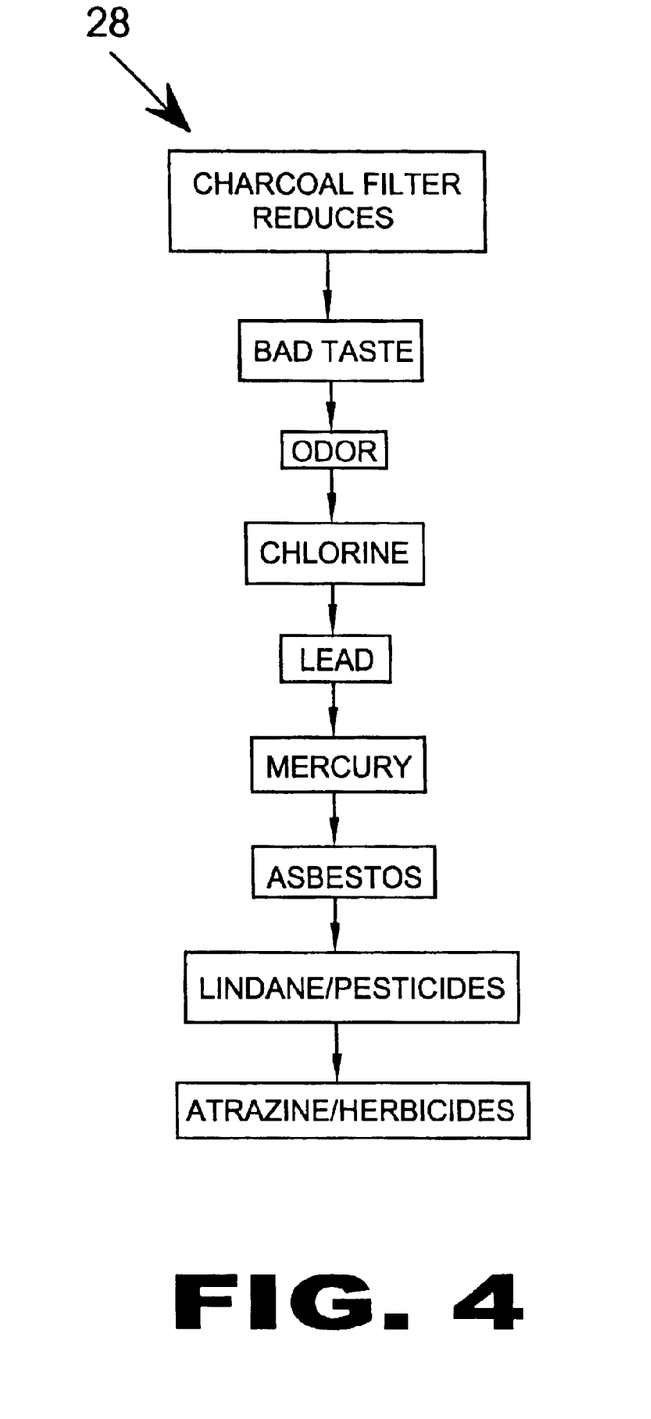
FIG. 4 is a flow diagram of the present invention.

Referring to FIG. 4, shown is a chart 28 of the impurities and undesirable properties that the charcoal filtering element 22 will help to reduce if not eliminate.

Figure 5:
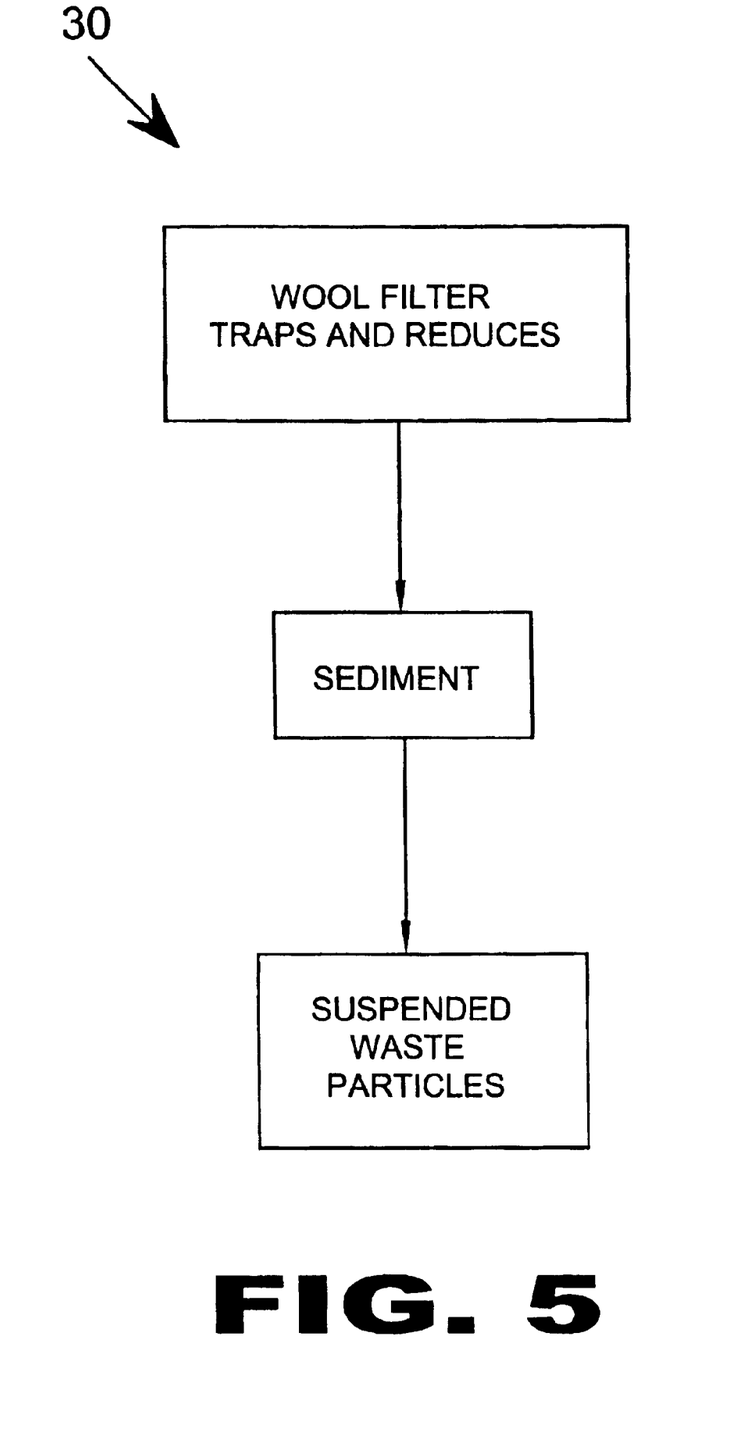
FIG. 5 is a flow diagram of the present invention.

Referring to FIG. 5, shown is a chart 30 of the impurities and undesirable properties that the fibrous filtering element 24 will help to reduce if not eliminate. The filter 24 is designed to reduce the intake of sediment and suspended waste particles from a beverage.

Figure 6:
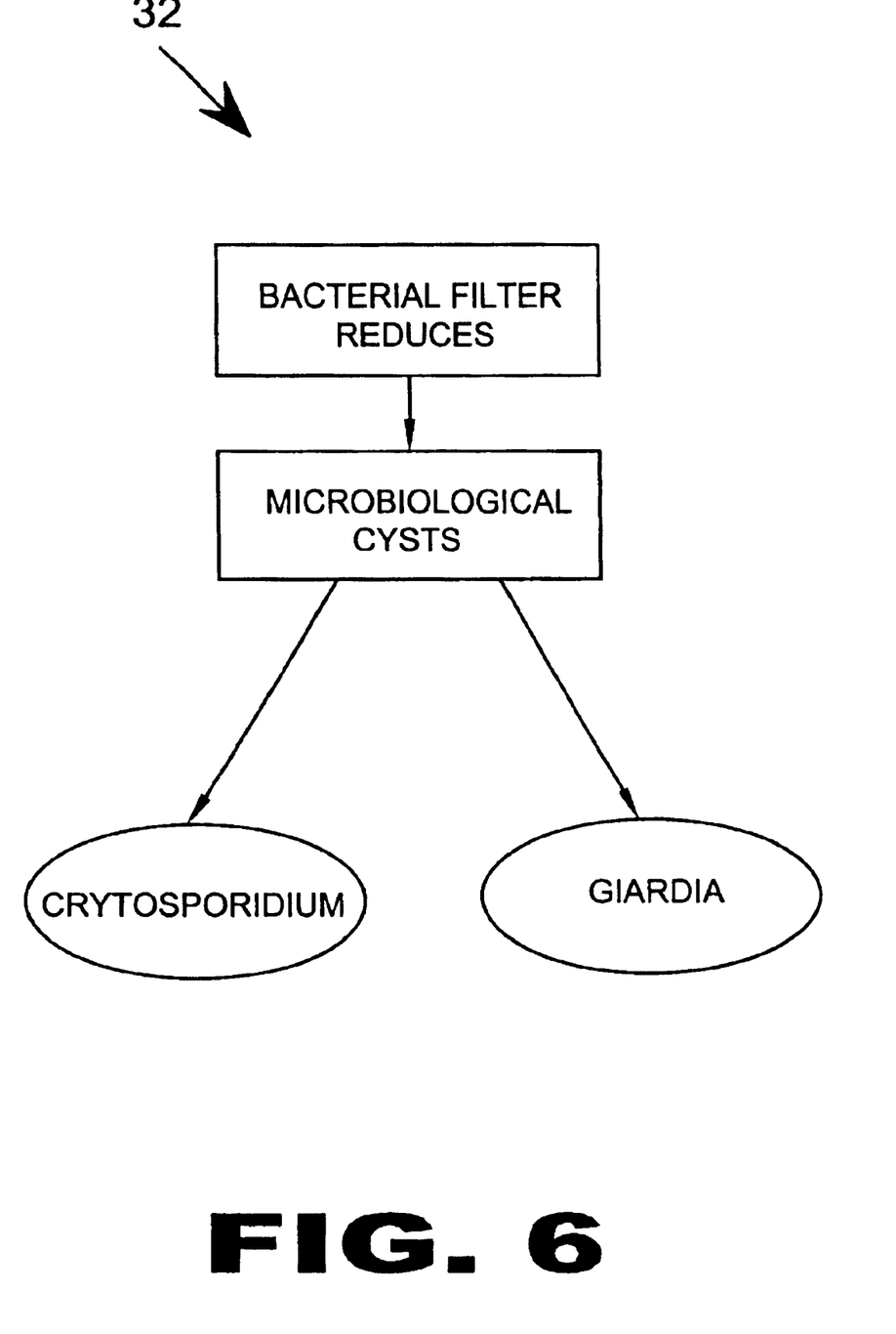
FIG. 6 is a flow diagram of the present invention.

Referring to FIG. 6, shown is a chart 32 of the impurities and undesirable properties that the biological filtering element 26 will help to reduce if not eliminate. The filtering element 26 is designed to reduce the intake of microbiological cysts from a beverage.

Figure 7:
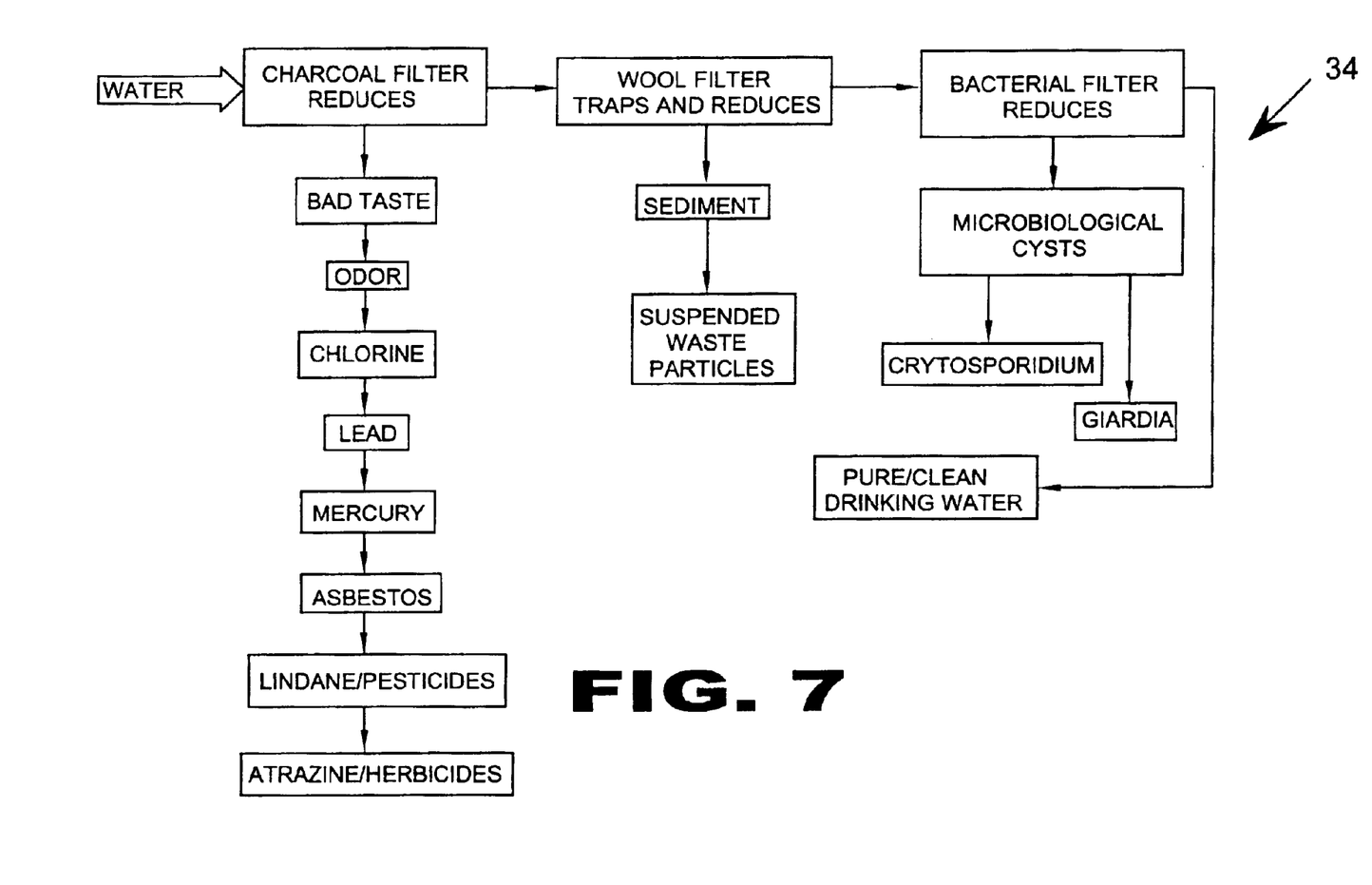
FIG. 7 is a block diagram of the functions of the present invention.

Referring to FIG. 7, shown is a chart 34 of the impurities and undesirable properties that the combination of the charcoal filtering element 22, fibrous filtering element 24 and biological filtering element 26 working in conjunction with each other will help to reduce if not eliminate. The purification system 10 is designed to reduce the intake of microbiological cysts, harmful contaminants and other impurities from a beverage.

Figure 8:
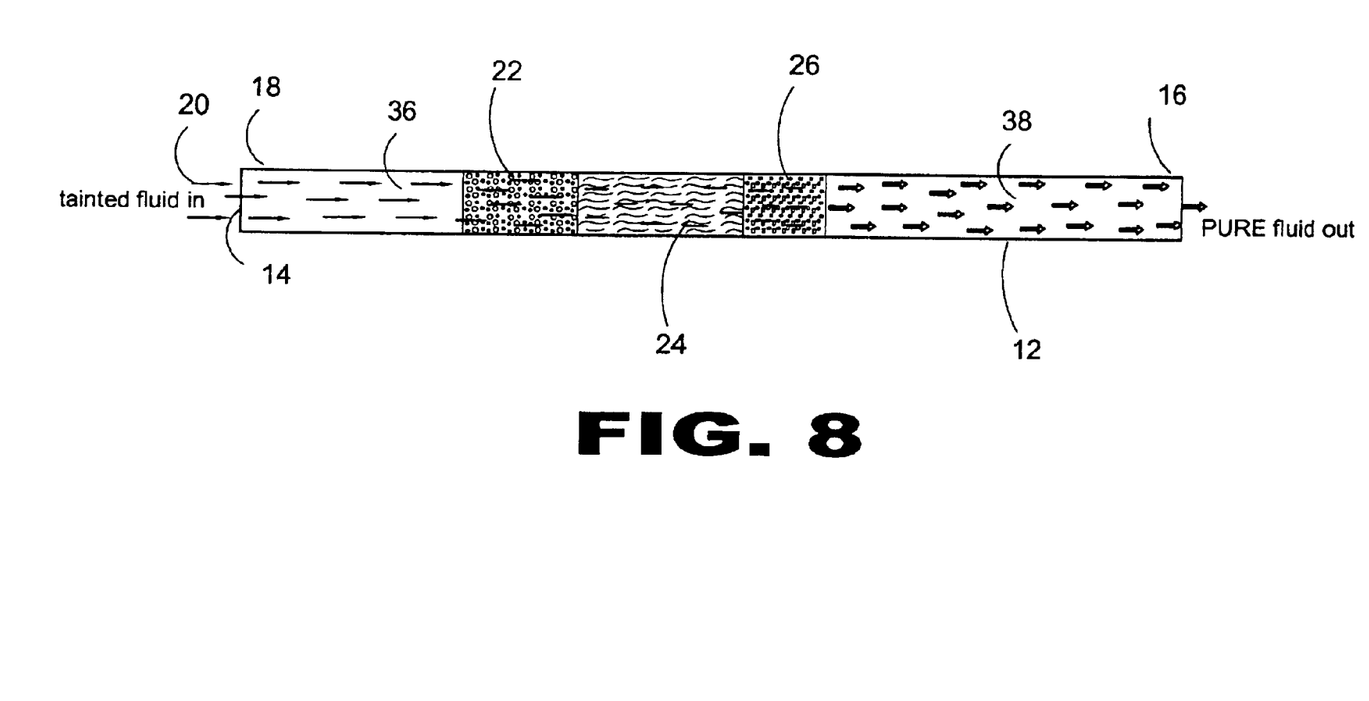
FIG. 8 is a side sectional view of the present invention.

Referring to FIG. 8, shown is a section view of the purification system 10 of the present invention having a fluid passing therethrough. The purification system 10 of the present invention comprises a tubular member 12 having a throughbore 14 with said tubular member 12 having a first end 16 and second end 18. The first end 16 is inserted into the mouth while the second distal end 18 is inserted into a beverage 20 to be consumed. The tubular member 12 contains central disposed filtering element that create an unfiltered beverage chamber 36 and a filtered beverage chamber 38 using a charcoal filtering element 22, fibrous filtering element 24, and biological filtering element 28 to produce an improved consumable beverage.

It will be understood that each of the elements described above, or two or more together may also find a useful application in other applications differing from that described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A drinking straw consisting of:
   a) a tubular structure with a wall having a first open end and a second open end;
   b) a fibrous filter centrally tubed between said first open end and said second open end within said tubular structure;
   c) said fibrous filter engaging said wall whereby a suction force can not dislodge said fibrous filter;
   d) said fibrous filter being made of a fibrous material whereby a fluid under a suction force will pass therethrough;
   e) said fibrous filter having a density for the removal of particle matter from said fluid and consists of a matted fibrous material made of a fluid impermeable substance;
   f) a filter consisting of carbon material adjacent to and in engagement with said fibrous filter on an upstream side thereof for reducing chlorine, lead, mercury, asbestos, lindane/pesticides and atrazine/herbicides to improve taste and odors;
   g) a biological filter adjacent to and in engagement with said fibrous filter on a downstream side thereof for removing microbiological cysts of ctytosporidium and giardia; and
   h) all of said filters being grouped together and forming an unfiltered beverage chamber on the upstream side of said filters and a filtered beverage chamber on the downstream side of said filters.

2. The purification system as recited in claim 1, wherein the matted fibrous material is wool.

\* \* \* \* \*